(12) United States Patent
Restrepo et al.

(10) Patent No.: US 10,453,181 B2
(45) Date of Patent: Oct. 22, 2019

(54) SYSTEMS AND METHODS FOR TRANSFORMING AN IMAGE

(71) Applicant: Facebook, Inc., Menlo Park, CA (US)

(72) Inventors: Alex Restrepo, San Francisco, CA (US); Kevin Systrom, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/586,910

(22) Filed: May 4, 2017

(65) Prior Publication Data

US 2017/0236253 A1    Aug. 17, 2017

Related U.S. Application Data

(63) Continuation of application No. 14/866,704, filed on Sep. 25, 2015, now Pat. No. 9,679,361, which is a
(Continued)

(51) Int. Cl.
*G06K 9/00* (2006.01)
*G06T 3/60* (2006.01)
(Continued)

(52) U.S. Cl.
CPC ............... *G06T 3/60* (2013.01); *G06F 3/017* (2013.01); *G06T 3/40* (2013.01); *G06T 3/606* (2013.01);
(Continued)

(58) Field of Classification Search
CPC ............. G06F 3/04883; G06F 3/04845; G06F 2203/04808; G06F 3/04815; G06F 3/0488;
(Continued)

(56) References Cited

U.S. PATENT DOCUMENTS 6,262,769 B1    7/2001   Anderson
7,080,324 B1    7/2006   Nelson
(Continued)

FOREIGN PATENT DOCUMENTS

CN    101996040    3/2011
CN    102906682    1/2013
(Continued)

OTHER PUBLICATIONS

European Patent Application No. 13190578.8, Search Report dated Oct. 17, 2016.
(Continued)

*Primary Examiner* — Li Liu
(74) *Attorney, Agent, or Firm* — Sheppard Mullin Richter & Hampton LLP

(57) ABSTRACT

Systems, methods, and computer-readable media acquire an image captured with a mobile device. Motion sensor data of the mobile device at or near a time when the image was captured is acquired. An angle of rotation is computed based on the motion sensor data, and the image is transformed based on the angle of rotation. In another aspect, a user interface enables user control over image transformation. The user interface enables user control over rotating an image on a display at two or more granularities. A point of rotation may be user-defined. Rotated images may be scaled to fit within a viewing frame for displaying the transformed image.

20 Claims, 10 Drawing Sheets

Related U.S. Application Data continuation of application No. 13/958,451, filed on Aug. 2, 2013, now Pat. No. 9,177,362.

(51) Int. Cl.
| | |
|---|---|
| *G06T 5/00* | (2006.01) |
| *H04N 5/232* | (2006.01) |
| *G06T 5/20* | (2006.01) |
| *G06T 7/73* | (2017.01) |
| *G06F 3/01* | (2006.01) |
| *G06T 3/40* | (2006.01) |

(52) U.S. Cl.
CPC ............... *G06T 5/002* (2013.01); *G06T 5/20* (2013.01); *G06T 7/74* (2017.01); *H04N 5/232* (2013.01)

(58) Field of Classification Search
CPC ........... G06F 2203/04806; G06F 3/017; G06F 3/0484; G06T 11/60; G06T 19/00; G06T 2200/24; G06T 3/60; H04N 1/3877
See application file for complete search history.

(56) References Cited

U.S. PATENT DOCUMENTS

| | | | |
|---|---|---|---|
| 7,679,625 B1 | 3/2010 | Fagans | |
| 8,314,817 B2 | 11/2012 | Williamson | |
| 8,416,217 B1* | 4/2013 | Eriksson | G06F 1/1616 |
| | | | 178/18.09 |
| 8,860,818 B1 | 10/2014 | Sachs | |
| 9,324,188 B1* | 4/2016 | Fram | G06T 19/00 |
| 2005/0168583 A1 | 8/2005 | Thomason | |
| 2006/0197843 A1 | 9/2006 | Yoshimatsu | |
| 2007/0067179 A1* | 3/2007 | Kerr | G06Q 20/20 |
| | | | 705/16 |
| 2008/0034289 A1* | 2/2008 | Doepke | G06F 3/04812 |
| | | | 715/700 |
| 2009/0002391 A1 | 1/2009 | Williamson | |
| 2009/0141046 A1 | 6/2009 | Rathnam | |
| 2009/0245774 A1 | 10/2009 | Uenaka | |
| 2009/0303204 A1 | 12/2009 | Nasiri | |
| 2010/0177197 A1 | 7/2010 | Kimura | |
| 2010/0245604 A1 | 9/2010 | Ohmiya | |
| 2010/0315438 A1 | 12/2010 | Horodezky | |
| 2011/0032384 A1 | 2/2011 | Ono | |
| 2011/0037866 A1 | 2/2011 | Iwamoto | |
| 2011/0057953 A1 | 3/2011 | Horodezky | |
| 2011/0061009 A1 | 3/2011 | Poisson | |
| 2011/0102464 A1* | 5/2011 | Godavari | G06F 3/0416 |
| | | | 345/650 |
| 2011/0187748 A1 | 8/2011 | Lee | |
| 2011/0228112 A1 | 9/2011 | Kaheel | |
| 2011/0316888 A1 | 12/2011 | Sachs | |
| 2012/0019562 A1* | 1/2012 | Park | G06F 3/0488 |
| | | | 345/657 |
| 2012/0069203 A1 | 3/2012 | Voss | |
| 2012/0092267 A1 | 4/2012 | Haug | |
| 2012/0131514 A1* | 5/2012 | Ansell | G06F 3/03543 |
| | | | 715/863 |
| 2012/0314919 A1* | 12/2012 | Sparks | G06F 19/321 |
| | | | 382/128 |
| 2013/0016122 A1 | 1/2013 | Bhatt | |
| 2013/0093705 A1 | 4/2013 | Huang | |
| 2013/0147974 A1 | 6/2013 | Ju | |
| 2013/0162600 A1 | 6/2013 | Chou | |
| 2013/0176439 A1 | 7/2013 | Lee | |
| 2013/0181919 A1* | 7/2013 | Yu | G06F 3/01 |
| | | | 345/173 |
| 2013/0235071 A1* | 9/2013 | Ubillos | G06F 3/0484 |
| | | | 345/600 |
| 2013/0239032 A1 | 9/2013 | Hong | |
| 2013/0318471 A1* | 11/2013 | Freyhult | G06F 3/0481 |
| | | | 715/798 |
| 2014/0092002 A1 | 4/2014 | Manzari | |
| 2014/0282073 A1 | 9/2014 | Curran | |
| 2014/0289663 A1 | 9/2014 | Zhang | |
| 2014/0298233 A1 | 10/2014 | Pettey | |
| 2014/0313135 A1 | 10/2014 | Pisters | |
| 2014/0343842 A1 | 11/2014 | Ranganathan | |
| 2015/0074573 A1* | 3/2015 | Teshima | G06F 3/04845 |
| | | | 715/765 |

FOREIGN PATENT DOCUMENTS

| | | |
|---|---|---|
| CN | 102566896 B | 6/2017 |
| GB | 2307383 | 5/1997 |
| JP | H09198224 | 7/1997 |
| JP | 2001512934 | 8/2001 |
| JP | 2002163052 | 6/2002 |
| JP | 2005523596 | 8/2005 |
| JP | 2006245726 | 9/2006 |
| JP | 2007127756 | 5/2007 |
| JP | 2009244489 | 10/2009 |
| JP | 2010252238 | 11/2011 |
| WO | 2013009828 | 1/2013 |
| WO | 2013024974 | 2/2013 |

OTHER PUBLICATIONS

International Application No. PCT/US2013/067578, International Search Report and Written Opinion dated Apr. 25, 2014.
ASCII Media Works Co., Ltd., "There is No Rule I Must Do This! Utilize SNS Further," ASCII PC magazine, vol. 16, No. 10, pp. 66-69, Jun. 24, 2013.
Kurihara, Ryo, "Classic WEB Service Freedom: Enjoy More Internet with This Service," Mac Fan magazine, vol. 6, No. 21, pp. 164-165, Jun. 1, 2013.
Japanese Patent Application No. 2016-531599, Office Action dated Jul. 11, 2017.
Sotechsha Co. Ltd., "Photoshop CC Super Reference for Windows," 1st Edition, ISBN 978-4-8007-1001-7, pp. 141-144, Jul. 15, 2013.
Japanese Patent Application No. 2016-531599, Office Action dated Apr. 10, 2018.

* cited by examiner

SYSTEMS AND METHODS FOR TRANSFORMING AN IMAGE

CROSS-REFERENCE TO RELATED APPLICATIONS

This application is a continuation of U.S. patent application Ser. No. 14/866,704, filed on Sep. 25, 2015 and entitled "Systems and Methods for Transforming an Image", which is a continuation of U.S. patent application Ser. No. 13/958,451, filed on Aug. 2, 2013 and entitled "Systems and Methods for Transforming an Image", which are all incorporated herein by reference.

FIELD OF THE INVENTION

The present invention relates to the field of image processing. More particularly, the present invention provides techniques for transforming images to account for tilt.

BACKGROUND

Today, people have many options available to take pictures. In addition to traditional cameras dedicated exclusively to capturing images in film or digital form, many mobile devices, such as smartphones, have the capability to take pictures. For example, a mobile device may include a camera and image capturing software that enables the user to take pictures with the camera on the mobile device. These images may be stored to the mobile device and viewed at a later time. In addition, some internet social networks provide users with the ability to share photos online. Members of these photo-sharing social networks may take pictures with their mobile devices and upload the pictures to the photo-sharing social network for others to see.

Images can be modified after they are captured. For example, the mobile device or a system supporting the social network may provide filters or other types of editing tools to allow manual alteration of the image. Sometimes, using these editing tools, the owner of the image may choose to modify an image to provide aesthetic improvements. In other instances, the editing tools may allow the owner of the image to modify other aspects of the image that are deemed undesirable.

SUMMARY

In various aspects of the present disclosure, systems, methods, and computer-readable media are provided that acquire an image captured with a mobile device. Motion sensor data of the mobile device at or near a time when the image was captured is also acquired. An angle of rotation is computed based on the motion sensor data, and the image is transformed based on the angle of rotation.

In an embodiment, the transformation of the image includes rotating the image based on the computed angle of rotation. The transformation of the image may include scaling the image based on the dimensions of a viewing frame of a user interface of the mobile device.

In an embodiment, the transformed image is displayed on the mobile device.

In an embodiment, the determining the angle of rotation is performed by the mobile device.

In an embodiment, the transformation of the image is performed by the mobile device.

In an embodiment, the acquisition of motion sensor data includes sampling data from a gyroscope. The sampled data may be filtered by a low pass filter to reduce noise.

In an embodiment, the acquisition of motion sensor data further includes sampling data from an accelerometer on the mobile device.

In an embodiment, a user input element to allow a user to select automatic transformation of the image is provided, and a selection for automatic transformation of the image is received. The transformation of the image is responsive to receipt of the selection.

In an embodiment, the acquired image is displayed on a display of the mobile device before the image is transformed. The transformed image is displayed instead of the acquired image on the display after the image is transformed.

In an embodiment, the angle of rotation is compared to a predetermined threshold angle. The transformed image is displayed when the angle of rotation does not exceed the predetermined threshold angle.

In an embodiment, a user interface is displayed comprising a first control element enabling user-controlled rotation of the transformed image at a first granularity. The first user input applied to the first control element is received, and the transformed image is rotated at the first granularity based on the first user input.

In an embodiment, a second control element enabling user-controlled rotation of the transformed image at a second granularity in the user interface is displayed. A second user input applied to the second control element is received, and the transformed image is rotated at the second granularity based on the second user input.

In an embodiment, movement of the first control element and the second control element in a first direction from a reference position rotates the image in a first rotational direction, and movement of the first control element and the second control element in a second direction from the reference position rotates the image in a second rotational direction.

In an embodiment, a user interface enables user definition of a point of rotation about which to rotate the transformed image. A first user input applied to the user interface to define a point of rotation is received. A second user input applied to the user interface to define a direction and a granularity of rotation is received. The transformed image is rotated about the point of rotation according to the direction and the granularity of rotation based on the first user input and the second user input.

In an embodiment, the mobile device is a mobile phone.

In an embodiment, the transformation of the image is performed by a social networking system.

Many other features and embodiments of the invention will be apparent from the accompanying drawings and from the following detailed description.

Figure 1:
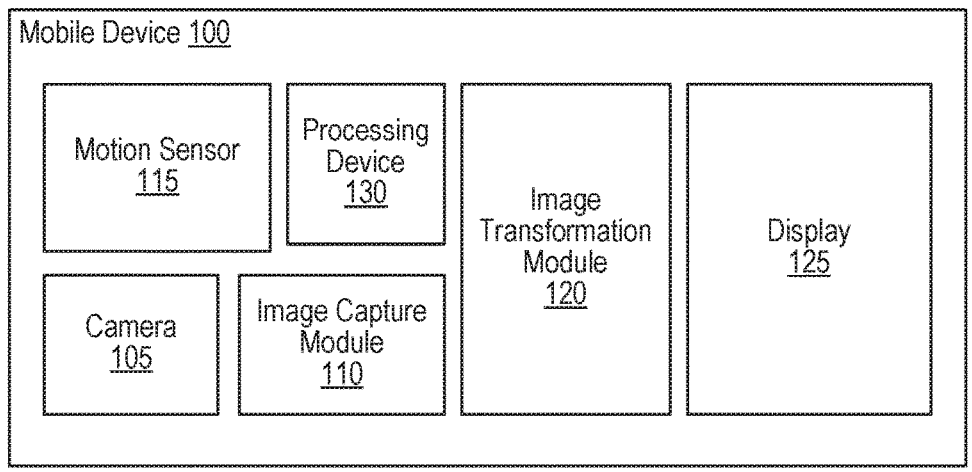
FIG. 1 illustrates an example mobile device, according to an embodiment of the present disclosure.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Image Transformation

Images captured by cameras, including cameras built in mobile devices, may suffer from certain shortcomings. The shortcoming may reflect irregularities in the image capture process and other factors. For example, when the camera is tilted during the time of image capture, the resulting captured image may reflect the tilt of the camera. The tilt may occur when the person controlling the camera positions the camera in a manner that does not conform to image alignment expectations. A tilted image may be aesthetically undesirable or unfaithful to the reality of the content depicted in the image.

A camera may be disposed within a mobile device. In an embodiment, a tilt of the mobile device may be based on a deviation of an axis of the mobile device from a reference axis. When the longitudinal axis (or latitudinal axis) of the mobile device is not aligned (i.e., parallel) with a vertical reference axis or horizontal reference axis, the mobile device may be considered to be tilted. A mobile device that is tilted during image capture may cause the captured image to appear tilted when displayed within a viewing frame of the mobile device.

It should be appreciated that while a tilt of the mobile device may be described in the present disclosure as based on a deviation of the longitudinal axis of the mobile device from a vertical reference axis, a tilt of the mobile device also may be based on a deviation of the latitudinal axis of the mobile device from the vertical reference axis. For example, when the latitudinal axis (or longitudinal axis) of the mobile device is not aligned (i.e., parallel) with a vertical reference axis or horizontal reference axis, the mobile device may be considered to be tilted.

To address the shortcomings described above, various embodiments of systems, methods, and computer readable media of the present disclosure may involve utilization of mobile device capabilities to remedy the occurrence of tilted images. Mobile devices may include a motion sensor that monitors a mobile device's movement and orientation. Motion sensors may, for instance, measure acceleration forces and rotational forces along the x-, y-, and z-axes. Example motion sensors may include, for example, gyroscopes and accelerometers. Motion sensor data generated from one or more motion sensors may be used to determine a tilt (or inclination) of the mobile device relative to a reference axis.

Images captured with a mobile device, as well as motion sensor data of the mobile device reflecting the position of the mobile device at or near a time when the image was captured, may be acquired. An angle of rotation necessary to correct the tilted image may then be computed based on the motion sensor data, and the image may be transformed based on the angle of rotation.

For example, a mobile device may include a camera and image capture software that enables a user to take a picture with the camera on the mobile device. If the user takes the picture while holding the mobile device at a tilt, then the captured image will be tilted accordingly when displayed within a viewing frame on the mobile device. Embodiments of the present disclosure enable the user to transform (e.g., rotate) the image to straighten the image or otherwise correct for the tilt of the mobile device and resulting image. In this way, for instance, a captured image may be straightened before storing the image on the mobile device or uploading it to a remote device, such as a remote server of a social networking system that enables users to store and share photos online. In one embodiment, the image capture software may be part of a mobile application for a social networking system, which a user may download to a mobile device to enable the user to capture images and post them online to the social networking system. The tilt correction based on the motion sensor may be included as part of the mobile application, for instance, and enable a user to correct the tilt of a captured image. In one embodiment, the tilt correction may occur automatically without user confirmation after the image is acquired. In another embodiment, the tilt correction may require user initiation or confirmation before transforming the image.

FIG. 1 illustrates an example mobile device, according to an embodiment of the present disclosure. A mobile device 100 is shown including a camera 105, an image capture module 110, a motion sensor 115, an image transformation module 120, a display 125, and a processing device 130. It should be appreciated that the components illustrated are not intended to be limiting, and that, to avoid obscuring details of the present disclosure, other components of the mobile device 100 are not illustrated—e.g., operating system, speaker, microphone, input controls element (e.g., touch screen, keypads, numerical pad, etc.), communication port, transceiver, memory, etc. Example mobile devices 100 may include, but are not limited to, smart-phones, tablets, laptops, personal digital assistants (PDAs), mobile telephones, etc., as discussed in connection with FIG. 11.

The camera 105 is disposed on the mobile device 100 and enables a user to capture an image with the mobile device 105. The camera 105 may, for instance, include a lens and image sensor that is used to generate image data representing an image (e.g., a picture) taken by the camera 105. For example, the image sensor may include, but is not limited to, a charge-coupled device (CCD) image sensor or a complementary metal-oxide-semiconductor (CMOS) sensor, which captures light and converts it to electrical signals. Additional electronic circuitry may be included to convert the electrical signals from the image sensor to digital signals representing the image.

The image capture module 110 operates in conjunction with the camera 105 to enable the capture of an image. For example, image capture module 110 may control the operation of the camera 105 during image capture. The image capture module 110 may also, for example, generate a user interface or viewfinder to allow the user to take a picture using the camera 105 on the mobile device 100.

The motion sensor 115 is disposed on the mobile device 100 and provides motion sensor data of the mobile device 100. The term "motion sensor data" is used broadly herein and may refer generally to data regarding movement, position, orientation, speed, etc. The motion sensor 115 may include an accelerometer, a gyroscope, or any other type of tool or resource that can produce motion sensor data. For example, the motion sensor 115 may be based on acceleration forces (e.g., from an accelerometer), rotational forces along the three axes (e.g., from a gyroscope), a combination of acceleration forces and rotational forces, etc. It should be appreciated that the motion sensor 115 is not intended to be limited to a single motion sensor but may encompass more than one motion sensor (e.g., an accelerometer and a gyroscope).

The image transformation module 120 transforms a captured image by rotating the captured image, and in some instances, additionally scaling the image. In one embodiment, the transformation is based on motion sensor data derived from the motion sensor 115. After acquiring the captured image and motion sensor data of the mobile device 100 at or near a time when the mobile device 100 captured the image, the image transformation module 120 determines an angle of rotation necessary to rotate the captured image to correct for the tilt of the mobile device 100 when the image was captured. For example, the image transformation module 120 may use the application programming interface (API) for the operating system of the mobile device 100 to receive and process the motion sensor data. For example, a framework for the operating system of the mobile device 100 may enable an application, such as an application that implements embodiments of tilt correction of the present disclosure, to receive motion sensor data from device hardware and process that data.

In an embodiment, the image transformation module 120 may specify a reference frame, and the orientation or motion of the mobile device may then be compared to that reference frame by the motion sensor 115. The motion sensor data may vary in form in different embodiments—e.g., vector, raw acceleration value, angular value relative to one or more reference axes, etc. The tilt of the mobile device 100 may be determined based on the motion sensor data and used to calculate the angle of rotation necessary to correct the tilted image. In an embodiment, the image transformation module 120 may specify a single axis of the reference frame, and only the motion sensor data with respect to the single axis is used to determine the tilt of the mobile device 100 and to transform tilted images.

In an embodiment, the image transformation module 120 provides control elements on a user interface to enable user control over image transformation. Based on the received user input applied through the control elements, the image is rotated and scaled accordingly. In another embodiment, the image transformation module 120 may transform images based on motion sensor data, as well as provide the control elements to enable user control over the transformation. For example, the image transformation module 120 may first transform the image based on motion sensor data, and thereafter transform the image based on user input applied through the user interface, or vice versa.

The display 125 may be based on any variety of technologies, such as liquid crystal display (LCD), organic light emitting diode (OLED), electronic paper, etc. In one embodiment, the display 125 is a touchscreen display that enables user input to be received via the display.

The processing device 130 is operably coupled to the camera 105, the motion sensor 115, and the display 125, and operates in conjunction with the image capture module 110 and the image transformation module 120 to perform the various techniques described in the present disclosure. The term "processing device" is used broadly herein and may include one or more processors, microprocessors, microcontrollers, etc. Additional details regarding example processing devices are described in FIG. 11.

It should be appreciated that one or more functional components may be combined into a single component. For example, the image capture module 110 and the image transformation module 120 may combined into a single module. In some instances, the image capture module 110 and the image transformation module 120 may be entirely or partially embodied in software and/or hardware on the mobile device 100 at the time of manufacturing. In some instances, for example, the image capture module 110 and the image transformation module 120 may be entirely or partially embodied in a software program (e.g., a mobile application) that is downloadable to the mobile device 100. Furthermore, in some instances, the image capture module 110 and the image transformation module 120 may work in conjunction with, or be part of, a social networking system that enables images to be shared online.

Figure 2:
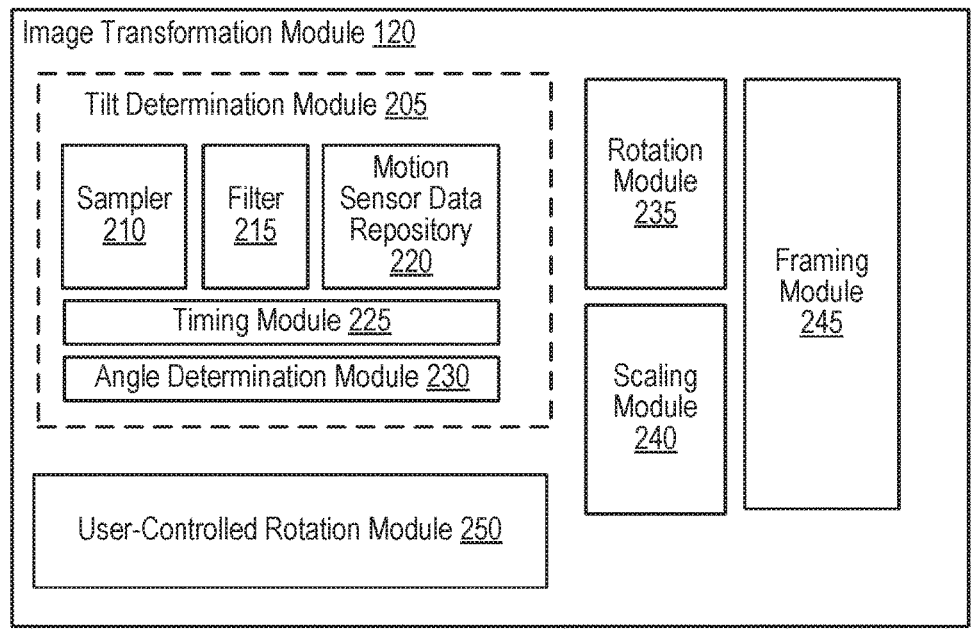
FIG. 2 illustrates an example image transformation module shown in FIG. 1, according to an embodiment of the present disclosure.

FIG. 2 illustrates an example image transformation module, according to an embodiment of the present disclosure. The image transformation module 120 includes a tilt determination module 205 that determines an angle of rotation for correcting the tilt of a captured image. Since images captured by the camera 105 on the mobile device 100 will reflect the tilt of the mobile device 100 at the time the image is captured (e.g., when the user takes a picture), the tilt of the mobile device 100 may be used to determine the tilt of an image that is captured with the tilted mobile device 100. The tilt determination module 205 determines the angle of rotation necessary to correct for the tilt of the mobile device 100 based on motion sensor data of the mobile device 100 at or near a time when the image was captured. In the embodiment shown, the tilt determination module 205 includes a sampler 210, a filter 215, a motion sensor data repository 220, a timing module 225, and an angle determination module 230.

The sampler 210 is configured to sample motion sensor data generated by the motion sensor 115 (e.g., gyroscope). For example, the sampler 210 may sample the motion sensor data at a predetermined sampling rate, such as 30 samples per second. It should be appreciated that other sampling rates may be implemented.

The filter 215 is configured to receive and filter the motion sensor data sampled from the sampler 210. For example, in an embodiment, the filter 215 may be a low pass filter that filters out high frequency noise to generate a cleaner signal. For example, in one embodiment, a Kalman filter may be implemented. Averaging techniques or other smoothing algorithms may be implemented to smooth out and make the data signal more stable—e.g., reducing noise in the motion sensor data.

The motion sensor data repository 220 is configured to receive and store the motion sensor data from the sampler 210 and the filter 215. The motion sensor data repository 220 may include, for example, one or more volatile (e.g., RAM, SRAM, etc.) and non-volatile memory (e.g., NVRAM or Flash memory, hard drive, etc.), which may store the motion sensor data for retrieval at a later time. In some instances, the motion sensor data repository 220 may be maintained in a more temporary form of memory, such as a data buffer. For example, the data buffer may be configured to hold a set amount of motion sensor data, and when the mobile device 100 enters into an image capture mode, the sampler 210 begins sampling the motion sensor data, which may then be filtered by the filter 215 and received by the data buffer 220.

The angle determination module 230 is configured to receive the motion sensor data from the motion sensor data repository 220 and to determine the tilt of the mobile device 100, which in turn may determine the angle of rotation necessary to correct the image that is captured while the mobile device 100 is tilted. For example, the angle determination module 230 may receive the motion sensor data from the motion sensor data repository 220 and compute the tilt of the mobile device 100 when the image was captured based on the motion sensor data, providing the angle of rotation to correct the tilted image.

The timing module 225 is used to determine the appropriate motion sensor data on which to base computation of the tilt. For example, the timing module 225 may be used to determine a set of motion sensor data that is used compute the tilt. In an embodiment, the timing module 225 identifies when the mobile device 100 enters an image capture mode (e.g., activates a photo capturing user interface for the user to take a picture) and when the image is captured (e.g., the user takes the picture). In such case, for instance, the angle determination module 230 bases the angle determination on the entire set of motion sensor data that is sampled and filtered from the time the image capture mode is entered until the time of image capture. In an embodiment, the angle determination module 230 may base the angle determination on other time periods or the occurrences of other events.

In an embodiment, the sampler 210 may begin sampling the motion sensor data when the timing module 225 indicates that the image capture mode has been entered. In an embodiment, the sampler 210 may already be sampling the motion sensor data, and the timing module 225 identifies the first sample of the set of motion sensor data as the sample corresponding to the time the image capture mode is entered.

In an embodiment, the sampler 210 may stop sampling the motion sensor data when the timing module 225 indicates that an image has been captured. In an embodiment, where the sampler 210 continues sampling after an image has been captured, the timing module 225 may identify the last sample of the set—e.g., the sample corresponding to the time the image was captured.

In another embodiment, the timing module 225 may identify the appropriate motion sensor data to use for the angle determination based on a predetermined time period or number of samples before (i.e., near in time to) the capture of an image. The angle determination module 230 uses the corresponding set of motion sensor data within the predetermined time period to compute the tilt and to determine the angle of rotation to correct the tilted image. For example, when a user captures an image, the last 30 samples from the time of capture may be used in the angle determination. Similarly, for example, the last 2 seconds of sampled motion sensor data from the time of image capture may be used for the angle determination. It should be appreciated that the predetermined time and number of samples are exemplary and are not intended to be limiting. Other predetermined times and samples may be implemented in other embodiments. It should also be appreciated that a single sample may also be used to compute the angle of rotation—e.g., the single sample corresponding to the time the image was captured. Furthermore, it should be appreciated that other methods to determine the specific set of motion sensor data of the angle of rotation computation may be implemented in other embodiments.

The rotation module 235, the scaling module 240, and the framing module 250 work in conjunction to rotate and scale the image within a viewing frame of a user interface that displays the captured and transformed images. The rotation module 235 rotates the captured image based on the angle of rotation determined by the angle determination module 230. For example, the rotation module 235 may use the angle of rotation to create a rotation transformation (e.g., in the form of a matrix) for the operating system to use to rotate the image accordingly.

The scaling module 240 may scale the image based on the angle of rotation determined to correct the tilt for the captured image. The scaling module 240 may determine a scaling factor based on dimensions of a viewing frame that is displayed by the framing module 245. For example, the image may be scaled to avoid the creation of empty spaces within the viewing frame when the image is rotated. In one embodiment, the scaling module 240 scales the rotated image by the minimum amount necessary to remove spaces in the viewing frame. In an embodiment, the framing module 245 may modify the size of the viewing frame based on the angle of rotation. For example, if enlarging an image to remove empty space in the viewing frame would render the image unclear (e.g., if the image has low resolution), the framing module 245 may shrink the viewing frame to remove the empty space otherwise created when the image is rotated.

In the embodiment shown, the image transformation module 120 also includes the user-controlled rotation module 250. The user-controlled rotation module 250 provides a user interface that enables user control over the rotation of the image. In this way, for example, the user may correct a tilted image by manually rotating the image accordingly.

In an embodiment, the user-controlled rotation module 250 provides a user interface that enables the user to control the rotation of the image according to more than one level of granularity. For example, the user interface may include a first control element that enables user-controlled rotation of an image at a first granularity, and a second control element that enables user-controlled rotation of the image at a second granularity. The second granularity may, for instance, rotate the image at a slower rate than the first granularity to enable more precise rotation by the user. In an embodiment, the first control element and the second control element are simultaneously displayed as dials that may be moved relative to a reference position to rotate the image clockwise or counterclockwise, respectively. Based on user input received for the first control element and the second control element, the user-controlled rotation module 250 rotates the image based on the first granularity and second granularity, respectively, within the viewing frame provided by framing module 245.

While the embodiment shown includes both the tilt determination module 205 and the user-controlled rotation module 250, it should be appreciated that in other embodiments either the tilt determination module 205 or the user-controlled rotation module 20 may be implemented without the other.

Figure 3:
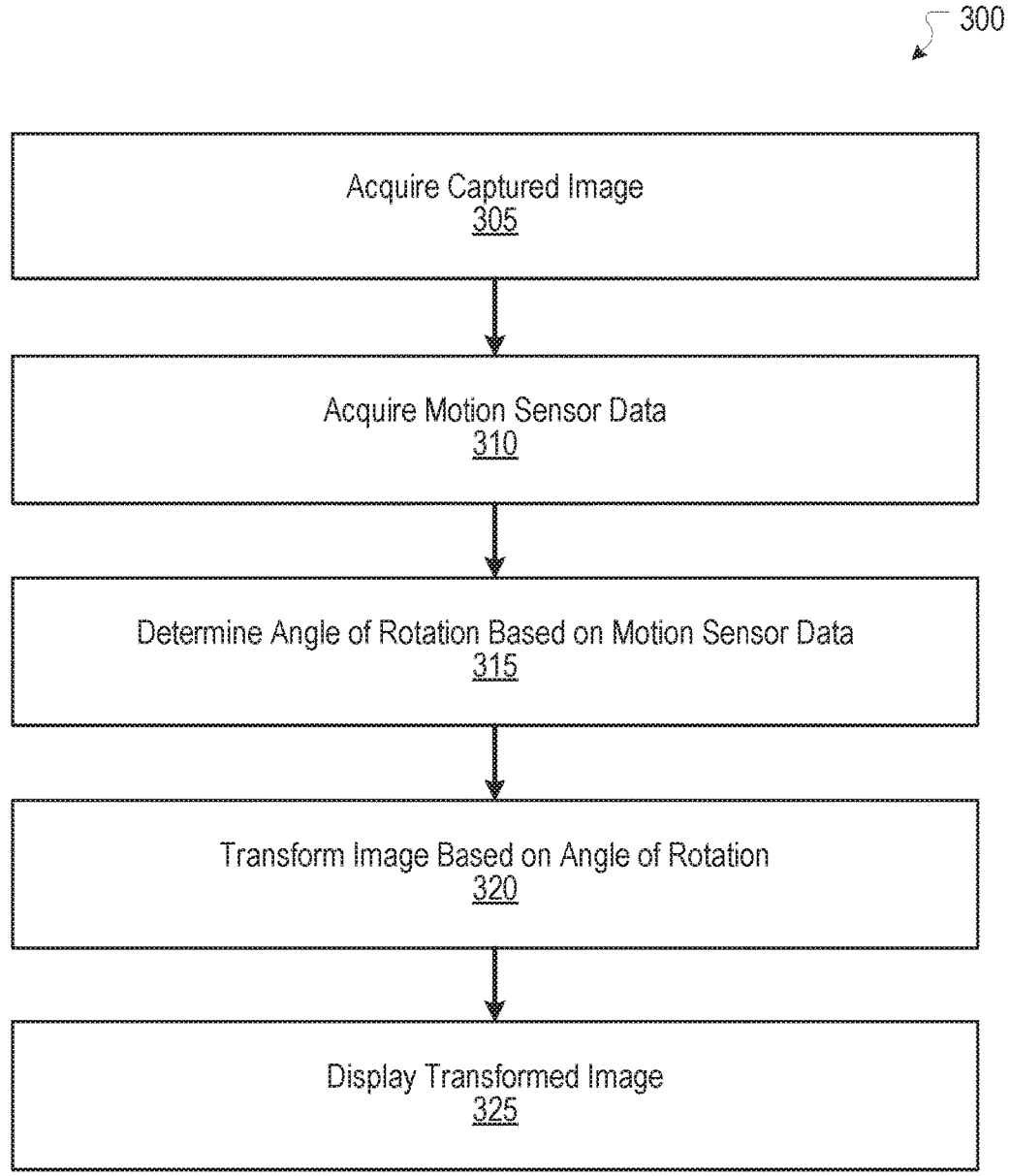
FIG. 3 illustrates an example process for transforming an image based on motion sensor data, according to an embodiment of the present disclosure.

FIG. 3 illustrates an example process for transforming an image based on motion sensor data, according to an embodiment of the present disclosure. At block 305 of process 300, an image captured by a mobile device is acquired. For example, in an embodiment, an image may be captured using a camera and an image capture program on the mobile device. For instance, the image capture module 110 shown in FIG. 2 may present the user with a user interface to take a picture with the camera 105 on the mobile device 100.

At block 310, motion sensor data is acquired for the mobile device at or near the time of capture. For example, in an embodiment, the image transformation module 120 acquires motion sensor data that is based on the tilt of the mobile device 100 during the time the image was captured. For instance, when the user enters an image capture mode on the mobile device 100, the sampler 210 begins sampling the motion sensor data from the gyroscope or other motion sensor implemented on the mobile device 100. The sampled motion sensor data may then be filtered and stored—e.g., by the filter 215 and the motion sensor data repository 220. In an embodiment, the motion sensor data is sampled, filtered, and stored until the user takes the picture. The amount of motion sensor data to be sampled, filtered, or stored, as well as the time period over which the motion sensor data is to be sampled, filtered, or stored, may be determined in various manners.

At block 315, an angle of rotation is computed based on the motion sensor data. For example, in an embodiment, the angle determination module 230 shown in FIG. 2 determines an angle of rotation to correct the tilt of the image. The angle determination module 230 receives the motion sensor data from the motion sensor data repository 220 and determines the tilt of the mobile device. The tilt may determine the angle of rotation to rotate the image to correct for the tilt of the mobile device 100 at the time the image was captured.

In one embodiment, the angle of rotation is compared to a predetermined threshold before transforming the image. The predetermined threshold, for instance, may represent a threshold at which a tilt of the image is assumed to be intended by the user—e.g., artistically or otherwise intentionally tilted. If the angle of rotation to correct a tilted image exceeds the predetermined threshold, then the image is not rotated to correct for tilt. For example, the threshold may be 45 degrees, or any other predetermined threshold. In some instances, the predetermined threshold may be selected by a social networking system that maintains the image, a user who uploaded or will view the image, or both. In some instances, information is provided to the user to indicate that the image rotation necessary to correct for the tilt exceeds the threshold. In some instances, user-confirmation or verification is requested to determine if image transformation should be performed regardless of the angle of rotation being greater than the threshold.

At block 320, the image is transformed based on the computed angle of rotation. For example, the rotation module 235 of FIG. 2 generates a rotation transformation to rotate the captured image by an angle of rotation computed by the angle determination module 230. In an embodiment, the captured image is also scaled based on the angle of rotation. For example, the scaling module 240 of FIG. 2 determines the scaling factor necessary to scale the captured image to fill a viewing frame that is displayed on a user interface.

At block 325, the transformed image is displayed. For example, the framing module of FIG. 2 may operate in conjunction with the rotation module, scaling module, and the image capture program to render the transformed image within a viewing frame of a user interface that is presented on the display of the mobile device. In some instances, the captured image is displayed in the viewing frame and subsequently replaced by the transformed image.

In an embodiment, the user may save or otherwise store the transformed image into memory on the mobile device 100 or communicate the transformed image to a remote server for storage within a social networking system. In some instances, the captured image may be saved on the mobile device 100 and/or communicated to a remote device. In some instances, the motion sensor data and/or the final computed angle of rotation to correct the tilted image may be saved with the captured image—e.g., as metadata included with the image data.

In one embodiment, for example, the transformation of the image is performed on the same mobile device 100 that acquires the image (e.g., captures the image with the camera 105 and provides the motion sensor data with the motion sensor 115). For example, a user of a mobile device 100 may take a picture using the mobile device 100 (e.g., smartphone), and the mobile device 100 may compute the angle of rotation necessary to correct for any tilt based on the motion sensor data of the mobile device 100 when the image was captured.

In another embodiment, a device, other than the mobile device 100 that captured the image, may acquire the captured image and motion sensor data and then perform the tilt correction. For instance, a desktop computer or other remote device (e.g., server) may be in wired or wireless communication with the mobile device 100 and receive the captured image and motion sensor data from the mobile device 100 that captures the image. The desktop computer or other remote device may then compute the angle of rotation and transform the image based on the motion sensor data. In some instances, the desktop computer or other remote device may receive the captured image and motion sensor data via the internet or from a portable memory device, such as flash memory, CD-ROM, etc. In some instances, the motion sensor data may be stored with the image data (e.g., within metadata) in an image file and stored on a device (e.g., the mobile device 100 which captured the image or other remote device).

Figure 4A:
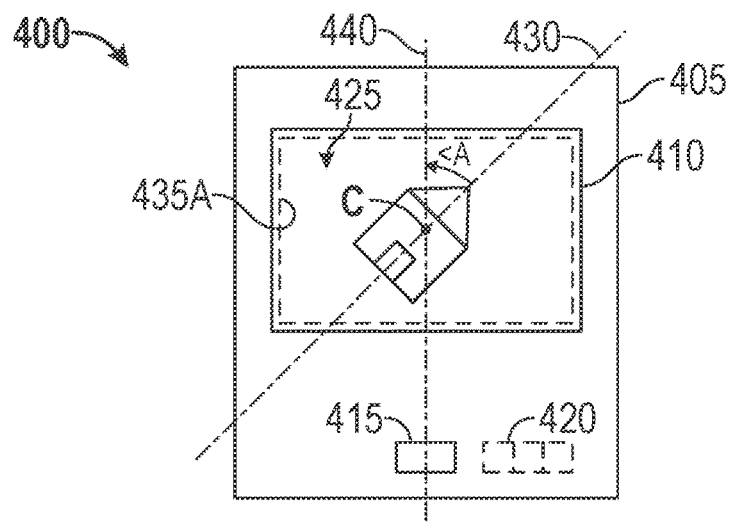
FIG. 4A illustrates an example user interface displaying an image before transformation, according to an embodiment of the present disclosure.
Figure 4B:
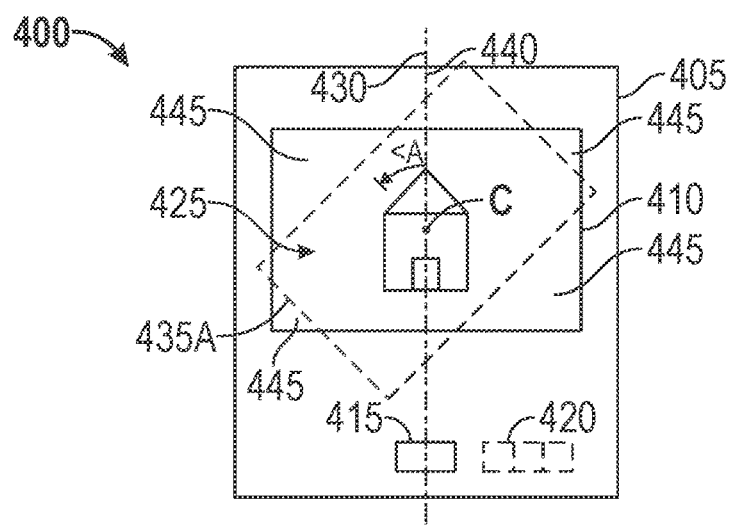
FIG. 4B illustrates the example user interface shown in FIG. 4A after the image is rotated, according to an embodiment of the present disclosure.

FIGS. 4A and 4B illustrate an example user interface displaying an image before and after transformation, respectively, according to an embodiment of the present disclosure. User interface 400 is shown displayed on display 405 of a mobile device. User interface 400 includes viewing frame 410 for displaying captured and transformed images. The user interface 400 also includes control element 415 that enables user control over initiating or otherwise activating the image transformation, as described herein. One or more additional control elements 420 may also be displayed, as shown, to allow or enable a user to perform one or more transformations on the captured image. Example additional control elements 420 may perform various transformations, such as cropping an image, sharpening an image, modifying the contrast of an image, etc. Any variety of additional transformations may also be implemented in other embodiments.

A captured image 425 including a house is displayed in the viewing frame 410. The captured image 425 was taken while the mobile device 100 was tilted, and the image of the depicted house is accordingly shown tilted within the viewing frame 410. A longitudinal axis 440 for the mobile device 100 is shown as a dotted line. Axis 430 represents a vertical reference axis at the time of image capture.

The captured image 425 is displayed in the viewing frame 410 such that the border 435A of the captured image 425 aligns with the viewing frame 410. It should be appreciated that in other embodiments, the border 435A may be larger or smaller than the viewing frame 410. Because the captured image 425 of the house was taken while the mobile device was tilted, the captured image 425 is shown displayed at a tilt within viewing frame 410. As shown, angle A represents the angle at which the captured image is tilted, and accordingly the angle of rotation necessary to correct the tilt (i.e., counterclockwise rotation by angle A).

FIG. 4B illustrates the captured image 425 after it has been rotated counterclockwise by angle A about the center point C. The border 435A represents the border for the captured image 425 after it has been rotated by angle A. Because the captured image 425 has been rotated, the border 435A of the captured image no longer aligns with the viewing frame 410, creating spaces 445 within the viewing frame 410 without image content. Because the captured image 425 has been rotated by angle A, the vertical reference axis 430 now aligns with the longitudinal axis 440 of the mobile device 100, correcting the tilt of the captured image 425 within the viewing frame 410.

Figure 4C:
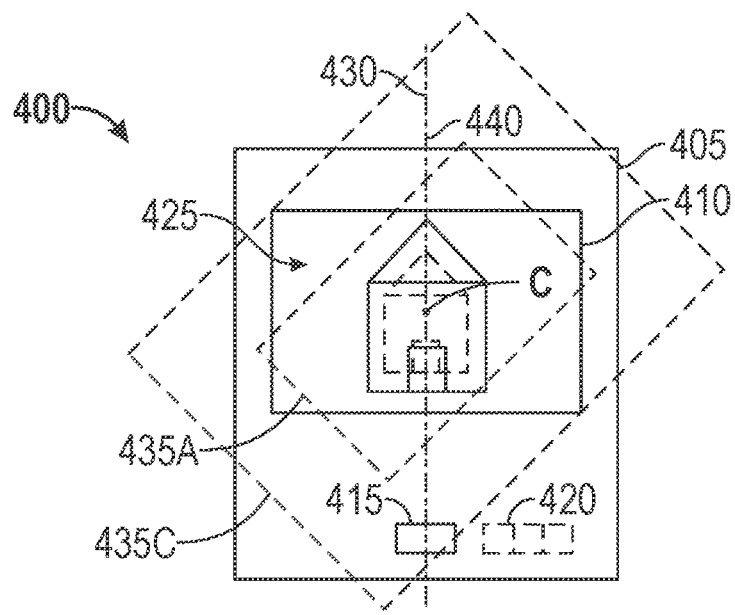
FIG. 4C illustrates the example user interface shown in FIG. 4A after the image is scaled and rotated, according to an embodiment of the present disclosure.

In an embodiment, the transformation of the captured image 425 includes scaling the captured image 425 in addition to rotating the captured image 425. In this way, for example, the captured image 425 may be scaled appropriately to increase the size of the border to fill the spaces 445. FIG. 4C illustrates the captured image 425 after it has been rotated counterclockwise by angle A and scaled to fill the spaces 445 created by rotation of the captured image 425. Border 435C represents the border 435A after being increased to fit the entire viewing frame 410 within the border so that no spaces 445 remain in the viewing frame 410. The scaling may be performed simultaneously with the rotation of the captured image, or may be performed sequentially.

Figure 5A:
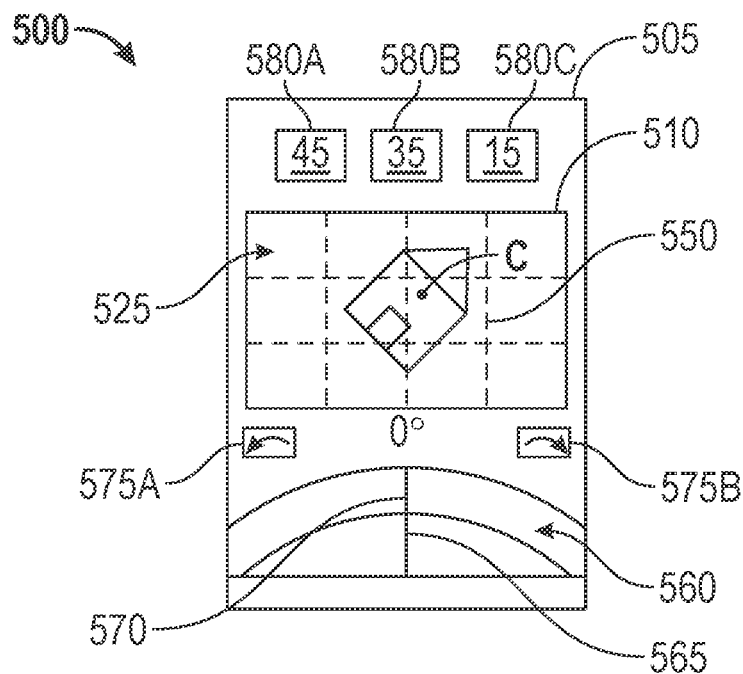
FIG. 5A illustrates an example user interface that provides user control over transforming an image, according to an embodiment of the present disclosure.
Figure 5B:
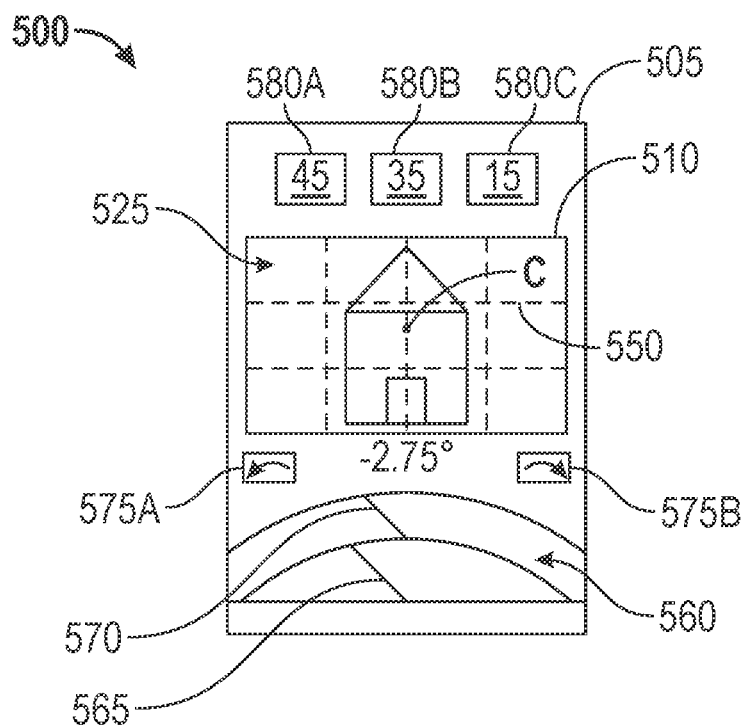
FIG. 5B illustrates the example user interface shown in FIG. 5A after the image is transformed, according to an embodiment of the present disclosure.

FIGS. 5A and 5B illustrate an example user interface enabling user control over transformation of a captured image, according to an embodiment of the present disclosure. FIG. 5A illustrates the example user interface before displaying a captured image, and FIG. 5B illustrates the example user interface after the captured image is transformed.

User interface 500 is shown displayed on display 505 of a mobile device. User interface 500 includes viewing frame 510 for displaying a captured image or a transformed image, or both. The user interface 500 also includes transformation control elements 560, 575A, 575B, 580A, 580B, and 580C that provide user control over transformation of a captured image. A grid 550 is displayed in the viewing frame 510 to provide the user with vertical and horizontal references.

In FIG. 5A, a captured image 525 is displayed in viewing frame 510. A user may use transformation control elements 560, 575A, 575B, 580A, 580B, and 580C to control the transformation of captured image 525. For example, in an embodiment, user interface 500 may be displayed on a touchscreen display, with transformation control elements 560, 575A, 575B, 580A, 580B, and 580C that are touch-activated or other otherwise touch-controlled.

Transformation control element 560 provides user control over the transformation of the captured image 525. Transformation control element 560 includes a first control element 565 that provides user control over rotating the captured image at a first granularity, and a second control element 570 that provides user control of rotating the captured image at a second granularity. For example, the control element with finer granularity provides the user with more fine-tuned control over the rotation of the capture image 525. In the embodiment shown, the captured image is rotated about the center point C of the viewing frame 510. Furthermore, in an embodiment, the captured image is additionally scaled to avoid spaces within the viewing frame without image content.

A distance or degree that the user slides or otherwise moves a first control element with a finer granularity may correlate to smaller degree of rotation than the same or similar distance of movement of a second control element with a larger granularity. For instance, in the embodiment shown, control elements 565 and 570 are embodied as dials that may be moved clockwise or counterclockwise from a default position along an arc by a user (e.g., via touching the dial and sliding it clockwise or counterclockwise), with control element 570 having a finer granularity than control element 565. The default position is the center of the arc where the dials are vertical, and corresponds to an initial position where the captured image is not rotated. As the user moves control element 565 or 570 in the clockwise direction, the captured image 525 is rotated clockwise at the respective granularity. Similarly, if the user moves control element 565 or 570 in the counterclockwise direction, the captured image 525 is rotated counterclockwise at the respective granularity. In this way, movement of control element 570 by a certain number of degrees along the corresponding arc from the default position results in a smaller degree of rotation of the captured image than the similar degree of movement of control element 565 along the corresponding arc. For example, movement of control element 565 by 90 degrees from the default position may rotate the captured image by 45 degrees, while movement of control element 570 by 90 degrees from the default position may rotate the captured image by 15 degrees. It should be appreciated that these values are exemplary and should not be construed as limiting. Furthermore, in another embodiment, control element 565 may be set to have finer granularity control compared to control element 570.

User interface 500 also includes transformation control elements 575A and 575B, which are embodied as user-controlled buttons displayed on the display 505. When a user clicks or otherwise activates control elements 575A and 575B, then the captured image is rotated either clockwise or counterclockwise accordingly. For example, clicking control element 575A may rotate the captured image counterclockwise a predetermined number of degrees, and clicking or otherwise activating control element 575B may rotate the captured image clockwise a predetermined number of degrees.

User interface 500 also includes transformation control elements 580A, 580B, and 580C, which provides the user with control over the granularity of control element 565. For example, when the user selects 580A, full movement of control element 565 across the dial (e.g., 90 degrees) results in a 45 degree rotation of the captured image. Similarly, when the user selects 580B, full movement of control element 565 across the dial (e.g., 90 degrees) results in a 35 degree rotation of the captured image. Similarly, when the user selects 580C, full movement of control element 565 across the dial (e.g., 90 degrees) results in a 15 degree rotation of the captured image in the respective direction. In an embodiment, the overall granularity of control element 570 is also changed respectively with selections of control elements 580A, 580B, and 580C, in addition to the overall granularity of control element 565. For example, in the example provided for control element 565, the granularity of control element 570 may be 15 degrees, 10 degrees, and 5 degrees for control elements 580A, 580B, and 580C, respectively. It should be appreciated that the values are exemplary and should not be construed as limiting. Other values may also be implemented in other embodiments.

FIG. 5B illustrates the captured image 525 after it has been rotated and scaled based on user input applied to the control elements 565 and 570. For example, the user may have first used control element 565 to rotate the captured image to an approximately level position (e.g., without tilt), and thereafter used control element 570, having a finer granularity, to level the tilted image with better precision. It should be appreciated that this order of use is exemplary, and that in some instances, the user may use the control elements 565 and 570 in a different order than provided in the example. Furthermore, in certain instances, the user may use only one of control elements 565 and 570 to level the tilted picture.

Figure 6A:
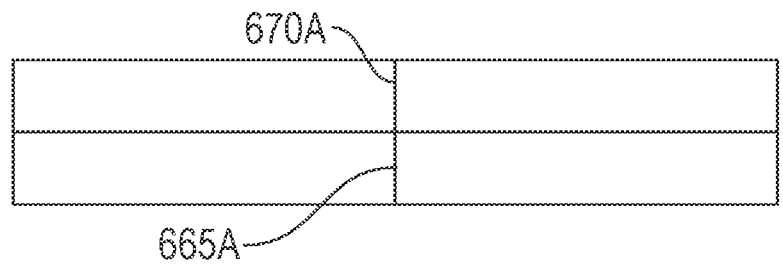
FIG. 6A illustrates an example control element, according to an embodiment of the present disclosure.

In another embodiment, the control element 560 may include another type of user motion or input apart from an arc-type motion. For instance, in an embodiment, the movement of the control elements may be linear. FIG. 6A illustrates an example control elements that are linear, according to one embodiment. Control elements 665A and 670A are shown in the default position and may be moved linearly to the right or left by the user to enable rotation of the captured image in the clockwise or counterclockwise direction. Control element 670A, for instance, may rotate the captured image with a finer granularity than control element 665A.

Figure 6B:
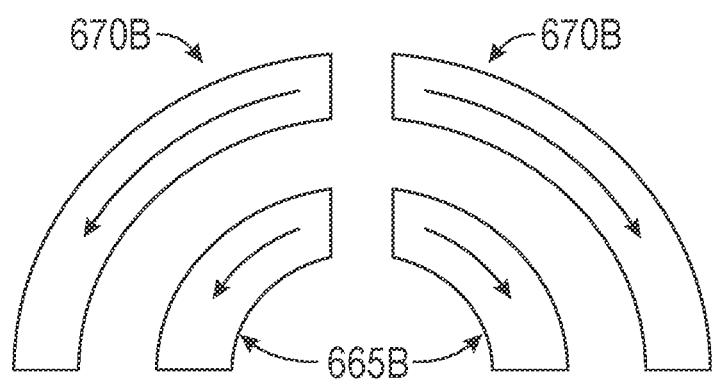
FIG. 6B illustrates an example control element, according to an embodiment of the present disclosure.

In yet another embodiment, the control elements may be implemented based on a user-controlled parameter such as a single click or other input provided tithe control elements. For example, FIG. 6B illustrates example control elements 665B and 670B in the form of buttons which may be clicked by a user. Clicking the control elements 665B, 670B may cause the capture image to rotate by a certain amount. The control element 670B may have finer granularity control correlating to a smaller degree of rotation than the control element 665B. For example, single click of control element 665B may cause a 5 degree tilt, and a single click of control element 670B may cause a 2 degree tilt. In certain instances, the user may be able to hold down the control elements to continuously rotate the captured image. In such case, the finer granularity control element rotates the captured image at a slower rate (e.g., degrees of rotation per second) than the larger granularity control element.

Figure 7:
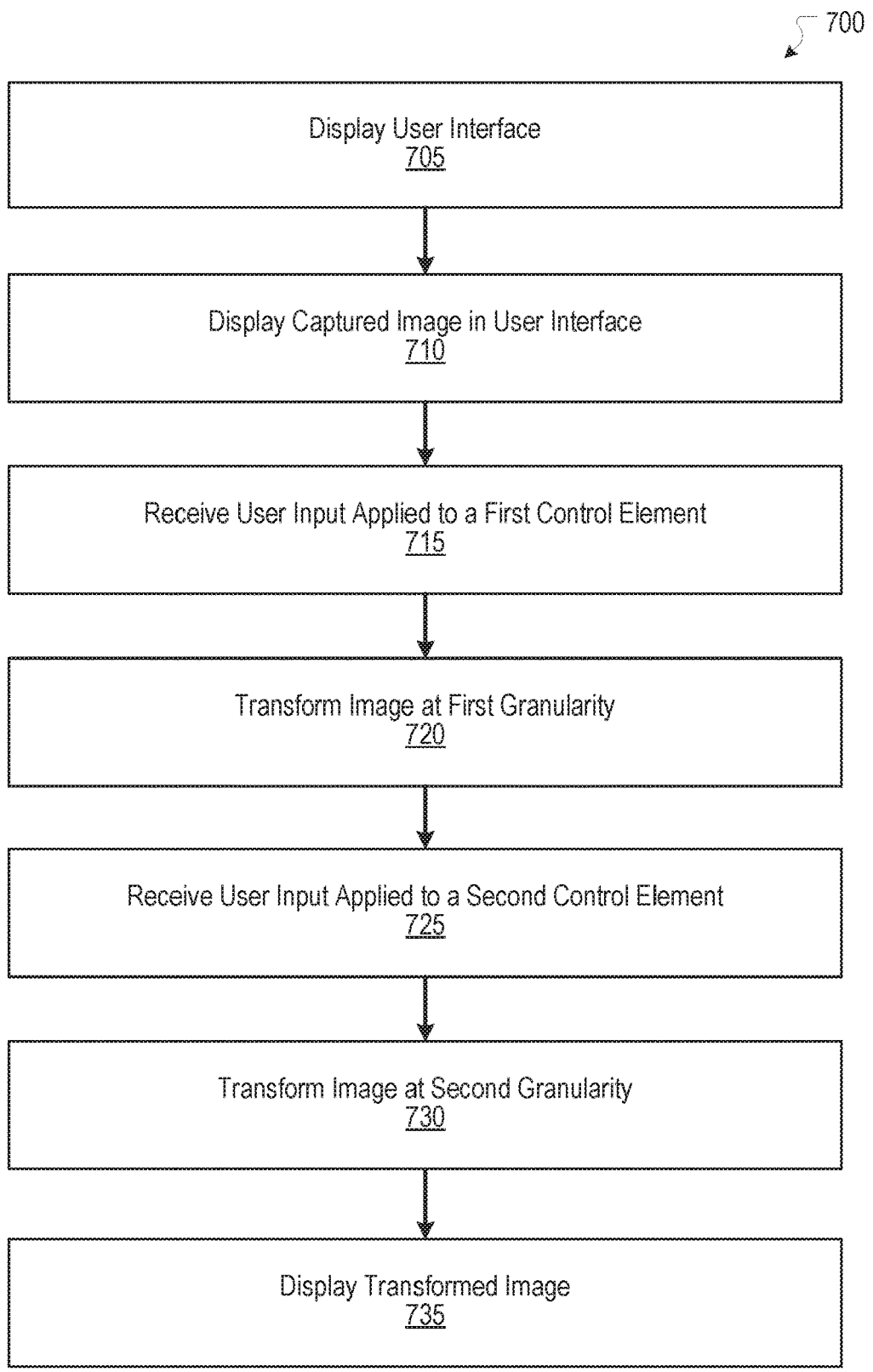
FIG. 7 illustrates an example process for transforming an image, according to an embodiment of the present disclosure.

FIG. 7 illustrates an example process for transforming an image, according to an embodiment of the present disclosure. At block 705 of process 700, a user interface, such as one described in FIGS. 5A, 5B, 6A, and 6B, is displayed on a display of a mobile device. At block 710, a captured image is displayed in a viewing frame of the user interface. At block 715, user input applied to a first control element is received that enables the user to transform the captured image according to a first granularity. At block 720, the captured image is transformed based on the user input associated with the first control element, and accordingly is displayed in the viewing frame as it is transformed. For example, with the embodiment shown in FIGS. 5A and 5B, rotation of the captured image may be displayed in the viewing frame 510 as it is rotated at the first granularity based on the user input.

At block 725, user input applied to a second control element is received. The second control element is also displayed on the user interface in addition to the first control element. The second control element enables the user to transform the captured image according to a second granularity, which is different than the granularity of the first control element. At block 730, the captured image is transformed based on user input received for the second control element, and accordingly is displayed in the viewing frame as it is transformed. For example, with the embodiment shown in FIGS. 5A and 5B, rotation of the captured image may be displayed in the viewing frame 510 as it is rotated at the second granularity based on the user input.

At block 735, once the transformation is complete (e.g., the user indicates completion of the transformation by pressing a corresponding button), the transformed image is finalized—e.g., saved or otherwise stored into memory of a device or communicated via the internet to a remote server for storage within a social networking system. In some instances, the captured image may be saved on a device and communicated to a remote device.

It should be appreciated that the processes described in FIGS. 3 and 7 may be performed in combination. For example, in an embodiment, the user interface 500 is provided and process 700 is performed after the captured image is transformed according to process 300 in FIG. 3. In this way, the user may choose to perform an automatic image transformation to correct for tilt, and thereafter be presented with user interface 500 to enable further manual, user-controlled transformations. In an embodiment, when the transformed image resulting from the process 300 is displayed on the display along with user interface 500, the control elements 565 and 570 may be positioned in a default position (e.g., vertical orientation). In another embodiment, when the transformed image resulting from the process 300 is displayed on the display along with user interface 500, the control elements 565 and 570 may be positioned to reflect the tilt angle of the captured image. In this way, a user may return the image to its pre-transformation state by moving the control elements 565 and 570 to the default position.

Figure 8:
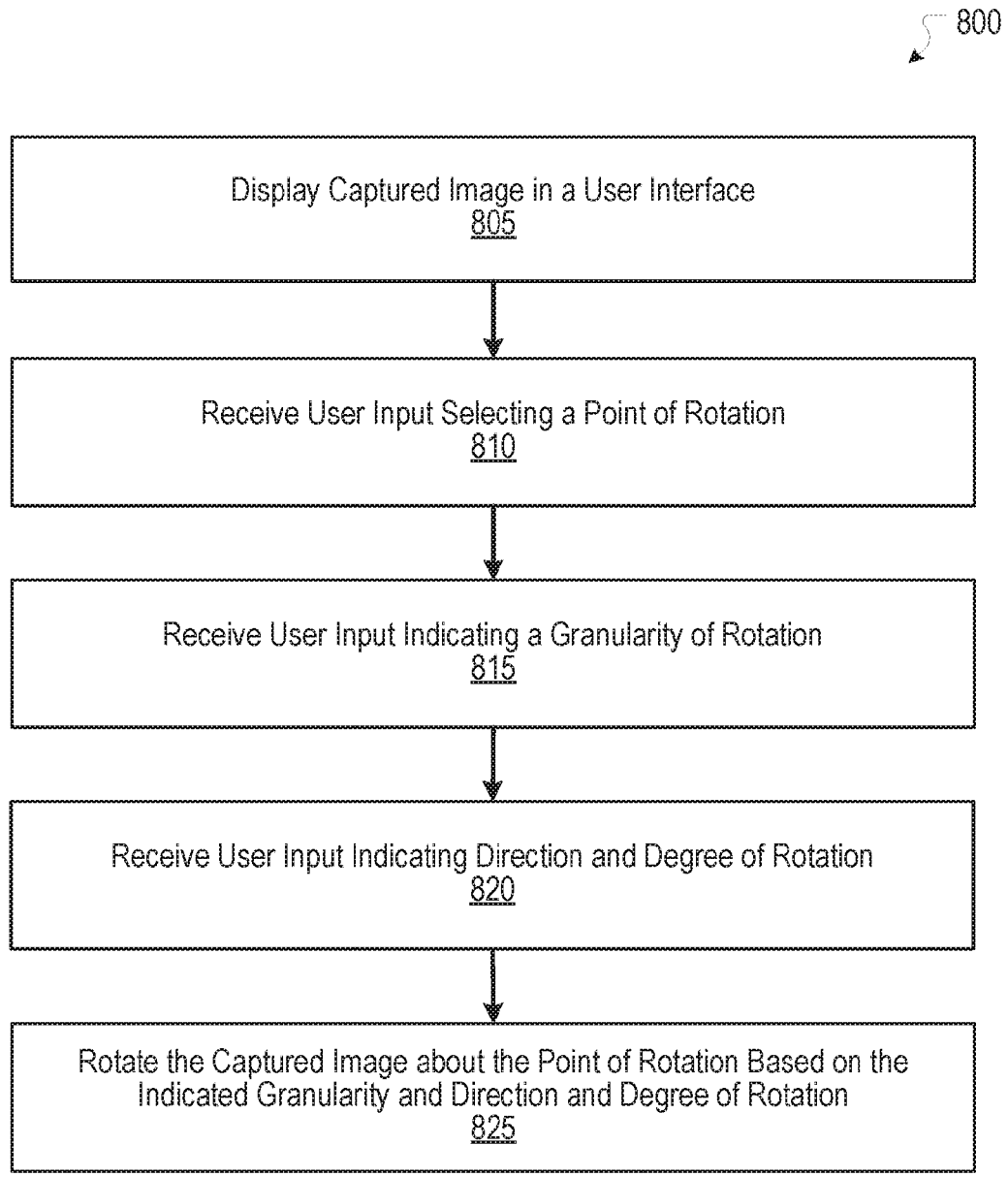
FIG. 8 illustrates an example process for transforming an image about a point of rotation defined by a user, according to an embodiment of the present disclosure.
Figure 9A:
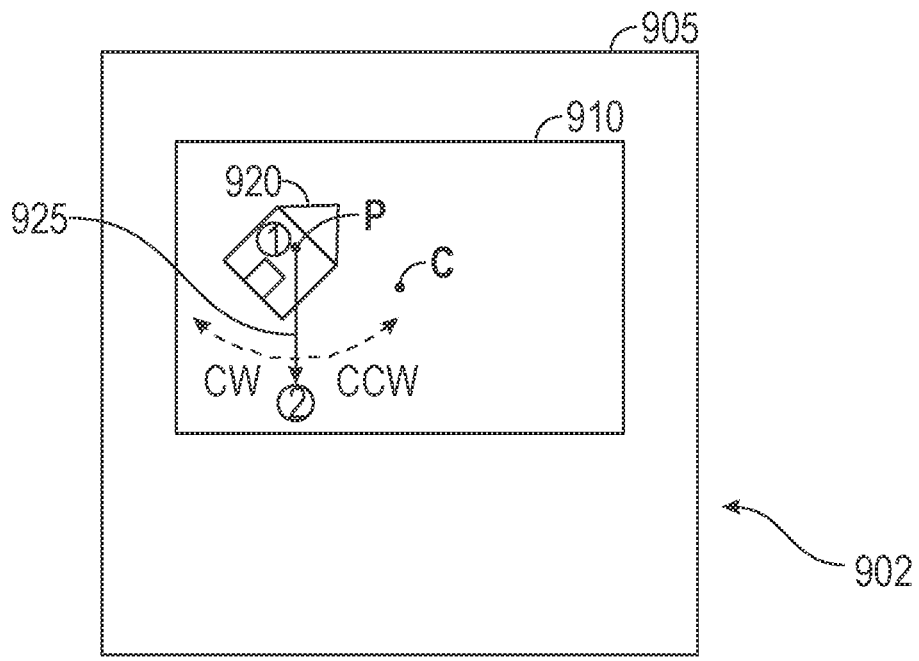
FIG. 9A illustrates an example user interface displaying an image before the process in FIG. 8 is performed, according to an embodiment of the present disclosure.
Figure 9B:
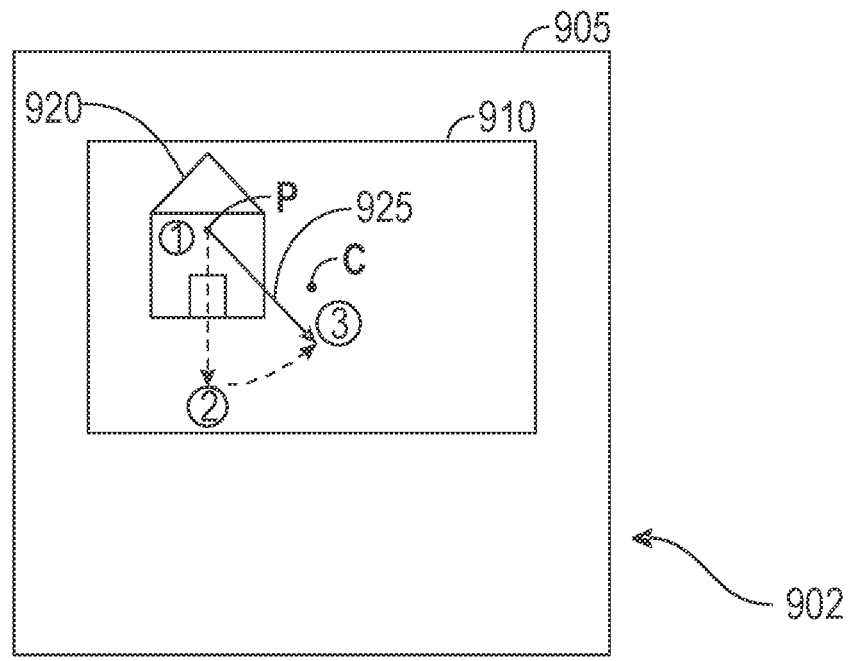
FIG. 9B illustrates the example user interface of FIG. 9A displaying an image that was transformed according to the process of FIG. 8, according to an embodiment of the present disclosure.

In the embodiments shown above, the captured image was rotated about the center C of the viewing frame 510. In other embodiments, the captured image may be rotated about a point of rotation that is not the center of the viewing frame. FIG. 8 illustrates an example process for transforming a captured image about a point of rotation selected by a user, according to an embodiment of the present disclosure. FIG. 9A illustrates an example user interface displaying an image before the process in FIG. 8 is performed, according to an embodiment of the present disclosure. FIG. 9B illustrates the example user interface of FIG. 9A displaying an image that was transformed according to the process of FIG. 8, according to an embodiment of the present disclosure. FIGS. 8, 9A, and 9B are described together herein.

At block 805 of process 800, user interface 902 is displayed on display 905 of a device (e.g., mobile device), and a captured image is displayed in a viewing frame 910 of the user interface 902. In the captured image shown in FIG. 9A, a house 920 is shown off-center from the center C of viewing frame 910.

At block 810, user input is received for a user selection of a point of rotation. For example, a user may touch a point P in the viewing frame 910 to identify the point of rotation, as represented by encircled reference number 1 in FIGS. 9A and 9B. In an embodiment, the point of rotation may be indicated on the user interface—e.g., as a dot or other reference.

At block 815, user input is received for indicating a granularity of rotation. For example, in an embodiment, the granularity of rotation is defined by the user sliding his finger away from the user-defined point of rotation P to a granularity selection point, as represented by encircled reference number 2 in FIGS. 9A and 9B. The granularity of rotation is computed based on the distance that the finger is slid away from the point of rotation. For example, in one embodiment, a granularity selection point that is a larger distance from the point of rotation generates a finer granularity than the granularity generated from a granularity selection point that is a smaller distance from the point of rotation. In yet another embodiment, a larger distance from the point of rotation generates a granularity that is less fine than the granularity generated from a smaller distance from the point of rotation. As the user slides his finger away from the point of rotation, a line 925 may be displayed in real time from the point of rotation to the position of the user's finger.

At block 820, user input is received for indicating a direction and degree of rotation. For example, in one embodiment, the direction of rotation is defined by the user sliding his finger clockwise or counterclockwise with respect to the point of rotation, as represented by encircled reference number 3 in FIG. 9B. The direction may be defined by the clockwise or counter clockwise direction that the finger is slid—e.g., clockwise rotating the captured image clockwise and counterclockwise rotating the captured image counterclockwise. Furthermore, the degree of rotation may be defined by how far the finger is slid to the clockwise or counterclockwise direction.

At block 825, the captured image is rotated about the point of rotation based on the indicated granularity and direction of rotation. As shown in FIG. 9B, the user's finger has been slid counterclockwise to a point represented by the encircled reference number 3, until the image was rotated to a depicted orientation.

In an embodiment, the captured image is rotated on the display as the user's finger is slid. In the embodiment shown, the line 925 is displayed from the point of rotation to the granularity selection point, and the length of the line remains fixed when rotated to the depicted position as the user slides his finger in the counterclockwise direction to encircled reference number 3.

In an embodiment, the user is required to continuously maintain his finger on the display while selecting the point of rotation, the granularity selection point, and the direction and degree of rotation. If, for example, the user lifts his finger off the display, then the user must repeat the selection of this information.

In one embodiment, the captured image is scaled while being rotated to eliminate any spaces between the rotated image and the viewing frame, as discussed in more detail herein.

Social Networking System—Example Implementation

Figure 10:
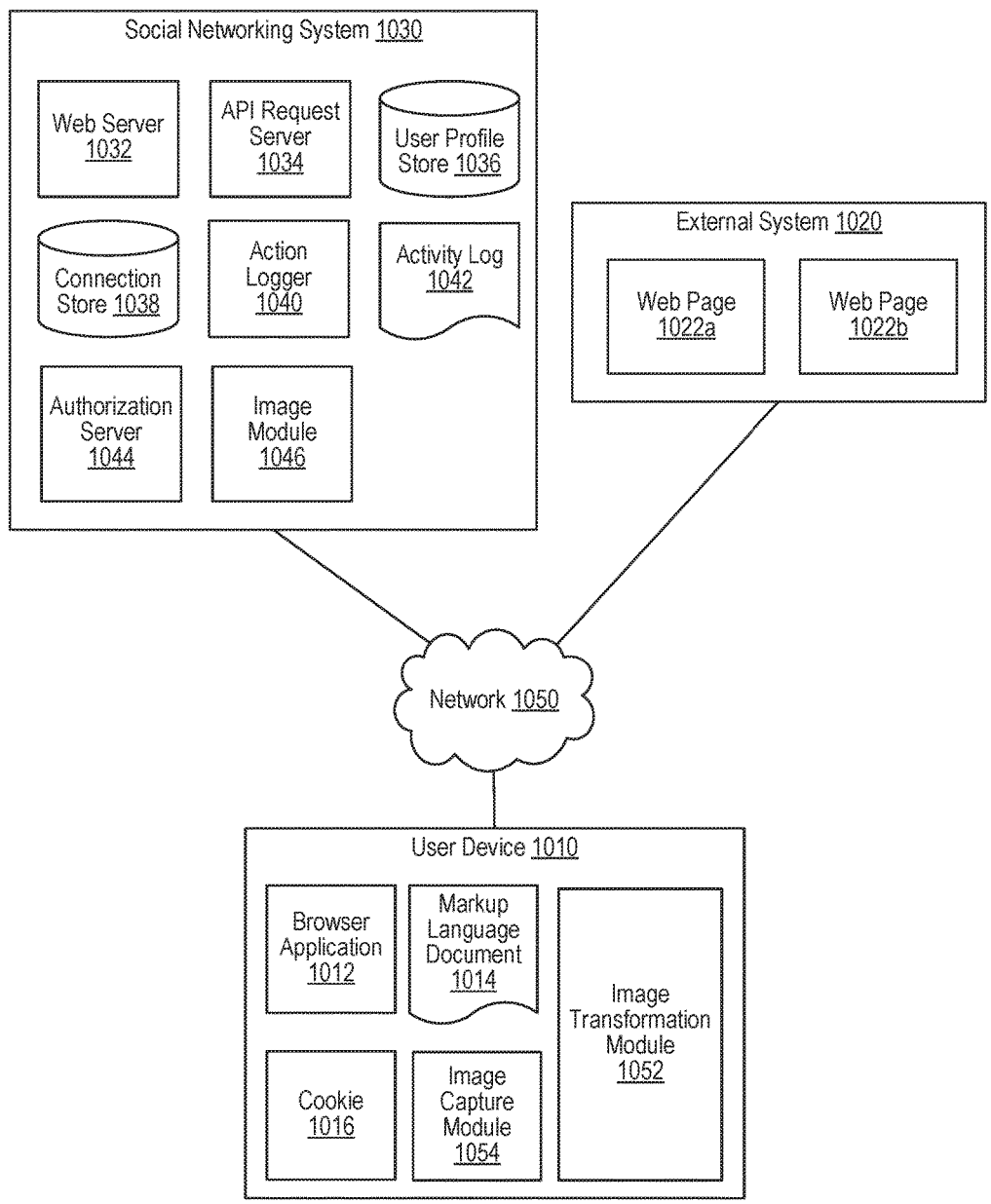
FIG. 10 is a network diagram of an example system for transforming images, according to an embodiment of the present disclosure.

FIG. 10 is a network diagram of an example system 1000 for transforming images in accordance with an embodiment of the present disclosure. The system 1000 includes one or more user devices 1010, one or more external systems 1020, a social networking system 1030, and a network 1050. In an embodiment, the social networking system discussed in connection with the embodiments described above may be implemented as the social networking system 1030. For purposes of illustration, the embodiment of the system 1000, shown by FIG. 10, includes a single external system 1020 and a single user device 1010. However, in other embodiments, the system 1000 may include more user devices 1010 and/or more external systems 1020. In certain embodiments, the social networking system 1030 is operated by a social network provider, whereas the external systems 1020 are separate from the social networking system 1030 in that they may be operated by different entities. In various embodiments, however, the social networking system 1030 and the external systems 1020 operate in conjunction to provide social networking services to users (or members) of the social networking system 1030. In this sense, the social networking system 1030 provides a platform or backbone, which other systems, such as external systems 1020, may use to provide social networking services and functionalities to users across the Internet.

The user device 1010 comprises one or more computing devices that can receive input from a user and transmit and receive data via the network 1050. In one embodiment, the user device 1010 is a conventional computer system executing, for example, a Microsoft Windows compatible operating system (OS), Apple OS X, and/or a Linux distribution. In another embodiment, the user device 1010 can be a device having computer functionality, such as a smart-phone, a tablet, a personal digital assistant (PDA), a mobile telephone, etc. The user device 1010 is configured to communicate via the network 1050. The user device 1010 can execute an application, for example, a browser application that allows a user of the user device 1010 to interact with the social networking system 1030. In another embodiment, the user device 1010 interacts with the social networking system 1030 through an application programming interface (API) provided by the native operating system of the user device 1010, such as iOS and ANDROID. The user device 1010 is configured to communicate with the external system 1020 and the social networking system 1030 via the network 1050, which may comprise any combination of local area and/or wide area networks, using wired and/or wireless communication systems.

In one embodiment, the network 1050 uses standard communications technologies and protocols. Thus, the network 1050 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 1050 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1050 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1010 may display content from the external system 1020 and/or from the social networking system 1030 by processing a markup language document 1014 received from the external system 1020 and from the social networking system 1030 using a browser application 1012. The markup language document 1014 identifies content and one or more instructions describing formatting or presentation of the content. By executing the instructions included in the markup language document 1014, the browser application 1012 displays the identified content using the format or presentation described by the markup language document 1014. For example, the markup language document 1014 includes instructions for generating and displaying a web page having multiple frames that include text and/or image data retrieved from the external system 1020 and the social networking system 1030. In various embodiments, the markup language document 1014 comprises a data file including extensible markup language (XML) data, extensible hypertext markup language (XHTML) data, or other markup language data. Additionally, the markup language document 1014 may include JavaScript Object Notation (JSON) data, JSON with padding (JSONP), and JavaScript data to facilitate data-interchange between the external system 1020 and the user device 1010. The browser application 1012 on the user device 1010 may use a JavaScript compiler to decode the markup language document 1014.

The markup language document 1014 may also include, or link to, applications or application frameworks such as FLASH™ or Unity™ applications, the SilverLight™ application framework, etc.

In one embodiment, the user device 1010 also includes one or more cookies 1016 including data indicating whether a user of the user device 1010 is logged into the social networking system 1030, which may enable modification of the data communicated from the social networking system 1030 to the user device 1010.

The external system 1020 includes one or more web servers that include one or more web pages 1022*a*, 1022*b*, which are communicated to the user device 1010 using the network 1050. The external system 1020 is separate from the social networking system 1030. For example, the external system 1020 is associated with a first domain, while the social networking system 1030 is associated with a separate social networking domain. Web pages 1022*a*, 1022*b*, included in the external system 1020, comprise markup language documents 1014 identifying content and including instructions specifying formatting or presentation of the identified content.

In an embodiment, the mobile device 100 may be implemented as the user device 1010. For example, the user device 1010 may be a mobile device that includes an image capture module 1054 and an image transformation module 1052. In an embodiment, the image capture module 1054 and the image transformation module 1052 may be implemented as the image capture module 110 and the image transformation module 120, respectively. The user device 1010 may also include other components not shown, such as a motion sensor, a camera, a display, and a processing device. The user device 1010 may perform the image transformations discussed herein.

The social networking system 1030 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1030 may be administered, managed, or controlled by an operator. The operator of the social networking system 1030 may be a human being, an automated application, or a series of applications for managing content, regulating policies, and collecting usage metrics within the social networking system 1030. Any type of operator may be used.

Users may join the social networking system 1030 and then add connections to any number of other users of the social networking system 1030 to whom they desire to be connected. As used herein, the term "friend" refers to any other user of the social networking system 1030 to whom a user has formed a connection, association, or relationship via the social networking system 1030. For example, in an embodiment, if users in the social networking system 1030 are represented as nodes in the social graph, the term "friend" can refer to an edge formed between and directly connecting two user nodes.

Connections may be added explicitly by a user or may be automatically created by the social networking system 1030 based on common characteristics of the users (e.g., users who are alumni of the same educational institution). For example, a first user specifically selects a particular other user to be a friend. Connections in the social networking system 1030 are usually in both directions, but need not be, so the terms "user" and "friend" depend on the frame of reference. Connections between users of the social networking system 1030 are usually bilateral ("two-way"), or "mutual," but connections may also be unilateral, or "one-way." For example, if Bob and Joe are both users of the social networking system 1030 and connected to each other, Bob and Joe are each other's connections. If, on the other hand, Bob wishes to connect to Joe to view data communicated to the social networking system 1030 by Joe, but Joe does not wish to form a mutual connection, a unilateral connection may be established. The connection between users may be a direct connection; however, some embodiments of the social networking system 1030 allow the connection to be indirect via one or more levels of connections or degrees of separation.

In addition to establishing and maintaining connections between users and allowing interactions between users, the social networking system 1030 provides users with the ability to take actions on various types of items supported by the social networking system 1030. These items may include groups or networks (i.e., social networks of people, entities, and concepts) to which users of the social networking system 1030 may belong, events or calendar entries in which a user might be interested, computer-based applications that a user may use via the social networking system 1030, transactions that allow users to buy or sell items via services provided by or through the social networking system 1030, and interactions with advertisements that a user may perform on or off the social networking system 1030. These are just a few examples of the items upon which a user may act on the social networking system 1030, and many others are possible. A user may interact with anything that is capable of being represented in the social networking system 1030 or in the external system 1020, separate from the social networking system 1030, or coupled to the social networking system 1030 via the network 1050.

The social networking system 1030 is also capable of linking a variety of entities. For example, the social networking system 1030 enables users to interact with each other as well as external systems 1020 or other entities through an API, a web service, or other communication channels. The social networking system 1030 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1030. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1030 modifies edges connecting the various nodes to reflect the relationships and interactions.

The social networking system 1030 also includes user-generated content, which enhances a user's interactions with the social networking system 1030. User-generated content may include anything a user can add, upload, send, or "post" to the social networking system 1030. For example, a user communicates posts to the social networking system 1030 from a user device 1010. Posts may include data such as status updates or other textual data, location information, images such as photos, videos, links, music or other similar data and/or media. Content may also be added to the social networking system 1030 by a third party. Content "items" are represented as objects in the social networking system 1030. In this way, users of the social networking system 1030 are encouraged to communicate with each other by posting text and content items of various types of media through various communication channels. Such communication increases the interaction of users with each other and increases the frequency with which users interact with the social networking system 1030.

The social networking system 1030 includes a web server 1032, an API request server 1034, a user profile store 1036, a connection store 1038, an action logger 1040, an activity log 1042, an authorization server 1044, and an image importing module 1046. In an embodiment of the invention, the social networking system 1030 may include additional, fewer, or different components for various applications. Other components, such as network interfaces, security mechanisms, load balancers, failover servers, management and network operations consoles, and the like are not shown so as to not obscure the details of the system.

The user profile store 1036 maintains information about user accounts, including biographic, demographic, and other types of descriptive information, such as work experience, educational history, hobbies or preferences, location, and the like that has been declared by users or inferred by the social networking system 1030. This information is stored in the user profile store 1036 such that each user is uniquely identified. The social networking system 1030 also stores data describing one or more connections between different users in the connection store 1038. The connection information may indicate users who have similar or common work experience, group memberships, hobbies, or educational history. Additionally, the social networking system 1030 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1030, such as non-person entities, buckets, cluster centers, images, interests, pages, external systems, concepts, and the like are also stored in the connection store 1038.

The social networking system 1030 maintains data about objects with which a user may interact. To maintain this data, the user profile store 1036 and the connection store 1038 store instances of the corresponding type of objects maintained by the social networking system 1030. Each object type has information fields that are suitable for storing information appropriate to the type of object. For example, the user profile store 1036 contains data structures with fields suitable for describing a user's account and information related to a user's account. When a new object of a particular type is created, the social networking system 1030 initializes a new data structure of the corresponding type, assigns a unique object identifier to it, and begins to add data to the object as needed. This might occur, for example, when a user becomes a user of the social networking system 1030, the social networking system 1030 generates a new instance of a user profile in the user profile store 1036, assigns a unique identifier to the user account, and begins to populate the fields of the user account with information provided by the user.

The connection store 1038 includes data structures suitable for describing a user's connections to other users, connections to external systems 1020 or connections to other entities. The connection store 1038 may also associate a connection type with a user's connections, which may be used in conjunction with the user's privacy setting to regulate access to information about the user. In an embodiment of the invention, the user profile store 1036 and the connection store 1038 may be implemented as a federated database.

Data stored in the connection store 1038, the user profile store 1036, and the activity log 1042 enables the social networking system 1030 to generate the social graph that uses nodes to identify various objects and edges connecting nodes to identify relationships between different objects. For example, if a first user establishes a connection with a second user in the social networking system 1030, user accounts of the first user and the second user from the user profile store 1036 may act as nodes in the social graph. The connection between the first user and the second user stored by the connection store 1038 is an edge between the nodes associated with the first user and the second user. Continuing this example, the second user may then send the first user a message within the social networking system 1030. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1030 (or, alternatively, in an image maintained by another system outside of the social networking system 1030). The image may itself be represented as a node in the social networking system 1030. This tagging action may create edges between the first user and the second user as well as create an edge between each of the users and the image, which is also a node in the social graph. In yet another example, if a user confirms attending an event, the user and the event are nodes obtained from the user profile store 1036, where the attendance of the event is an edge between the nodes that may be retrieved from the activity log 1042. By generating and maintaining the social graph, the social networking system 1030 includes data describing many different types of objects and the interactions and connections among those objects, providing a rich source of socially relevant information.

The web server 1032 links the social networking system 1030 to one or more user devices 1010 and/or one or more external systems 1020 via the network 1050. The web server 1032 serves web pages, as well as other web-related content, such as Java, JavaScript, Flash, XML, and so forth. The web server 1032 may include a mail server or other messaging functionality for receiving and routing messages between the social networking system 1030 and one or more user devices 1010. The messages can be instant messages, queued messages (e.g., email), text and SMS messages, or any other suitable messaging format.

The API request server 1034 allows one or more external systems 1020 and user devices 1010 to call access information from the social networking system 1030 by calling one or more API functions. The API request server 1034 may also allow external systems 1020 to send information to the social networking system 1030 by calling APIs. The external system 1020, in one embodiment, sends an API request to the social networking system 1030 via the network 1050, and the API request server 1034 receives the API request. The API request server 1034 processes the request by calling an API associated with the API request to generate an appropriate response, which the API request server 1034 communicates to the external system 1020 via the network 1050. For example, responsive to an API request, the API request server 1034 collects data associated with a user, such as the user's connections that have logged into the external system 1020, and communicates the collected data to the external system 1020. In another embodiment, the user device 1010 communicates with the social networking system 1030 via APIs in the same manner as external systems 1020.

The action logger 1040 is capable of receiving communications from the web server 1032 about user actions on and/or off the social networking system 1030. The action logger 1040 populates the activity log 1042 with information about user actions, enabling the social networking system 1030 to discover various actions taken by its users within the social networking system 1030 and outside of the social networking system 1030. Any action that a particular user takes with respect to another node on the social networking system 1030 may be associated with each user's account, through information maintained in the activity log 1042 or in a similar database or other data repository. Examples of actions taken by a user within the social networking system 1030 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1030, the action is recorded in the activity log 1042. In one embodiment, the social networking system 1030 maintains the activity log 1042 as a database of entries. When an action is taken within the social networking system 1030, an entry for the action is added to the activity log 1042. The activity log 1042 may be referred to as an action log.

Additionally, user actions may be associated with concepts and actions that occur within an entity outside of the social networking system 1030, such as an external system 1020 that is separate from the social networking system 1030. For example, the action logger 1040 may receive data describing a user's interaction with an external system 1020 from the web server 1032. In this example, the external system 1020 reports a user's interaction according to structured actions and objects in the social graph.

Other examples of actions where a user interacts with an external system 1020 include a user expressing an interest in an external system 1020 or another entity, a user posting a comment to the social networking system 1030 that discusses an external system 1020 or a web page 1022a within the external system 1020, a user posting to the social networking system 1030 a Uniform Resource Locator (URL) or other identifier associated with an external system 1020, a user attending an event associated with an external system 1020, or any other action by a user that is related to an external system 1020. Thus, the activity log 1042 may include actions describing interactions between a user of the social networking system 1030 and an external system 1020 that is separate from the social networking system 1030.

The authorization server 1044 enforces one or more privacy settings of the users of the social networking system 1030. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1020, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1020. One embodiment allows the specification of the set of entities to comprise an enumeration of entities. For example, the user may provide a list of external systems 1020 that are allowed to access certain information. Another embodiment allows the specification to comprise a set of entities along with exceptions that are not allowed to access the information. For example, a user may allow all external systems 1020 to access the user's work information, but specify a list of external systems 1020 that are not allowed to access the work information. Certain embodiments call the list of exceptions that are not allowed to access certain information a "block list". External systems 1020 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1044 contains logic to determine if certain information associated with a user can be accessed by a user's friends, external systems 1020, and/or other applications and entities. The external system 1020 may need authorization from the authorization server 1044 to access the user's more private and sensitive information, such as the user's work phone number. Based on the user's privacy settings, the authorization server 1044 determines if another user, the external system 1020, an application, or another entity is allowed to access information associated with the user, including information about actions taken by the user.

The social networking system 1030 may include an image module 1046. The image module 1046 may communicate with the user device 1010 to upload one or more images from the user device to the social networking system 1030. For example, the image module 1046 may receive a transformed image that has been captured by and transformed by the user device 1010. In addition, the image module 1046 may implement the functionality of the image transformation module 1052. In an embodiment, the image transformation techniques described herein may be performed by a suitable combination of the image module 1046 and the image transformation module 1052. For example, based on motion sensor data and other information provided by the mobile device 100 as discussed herein, the computation of the angle of rotation for a tilted image may be performed by the image module 1046, the image transformation module 1052, or both.

Figure 11:
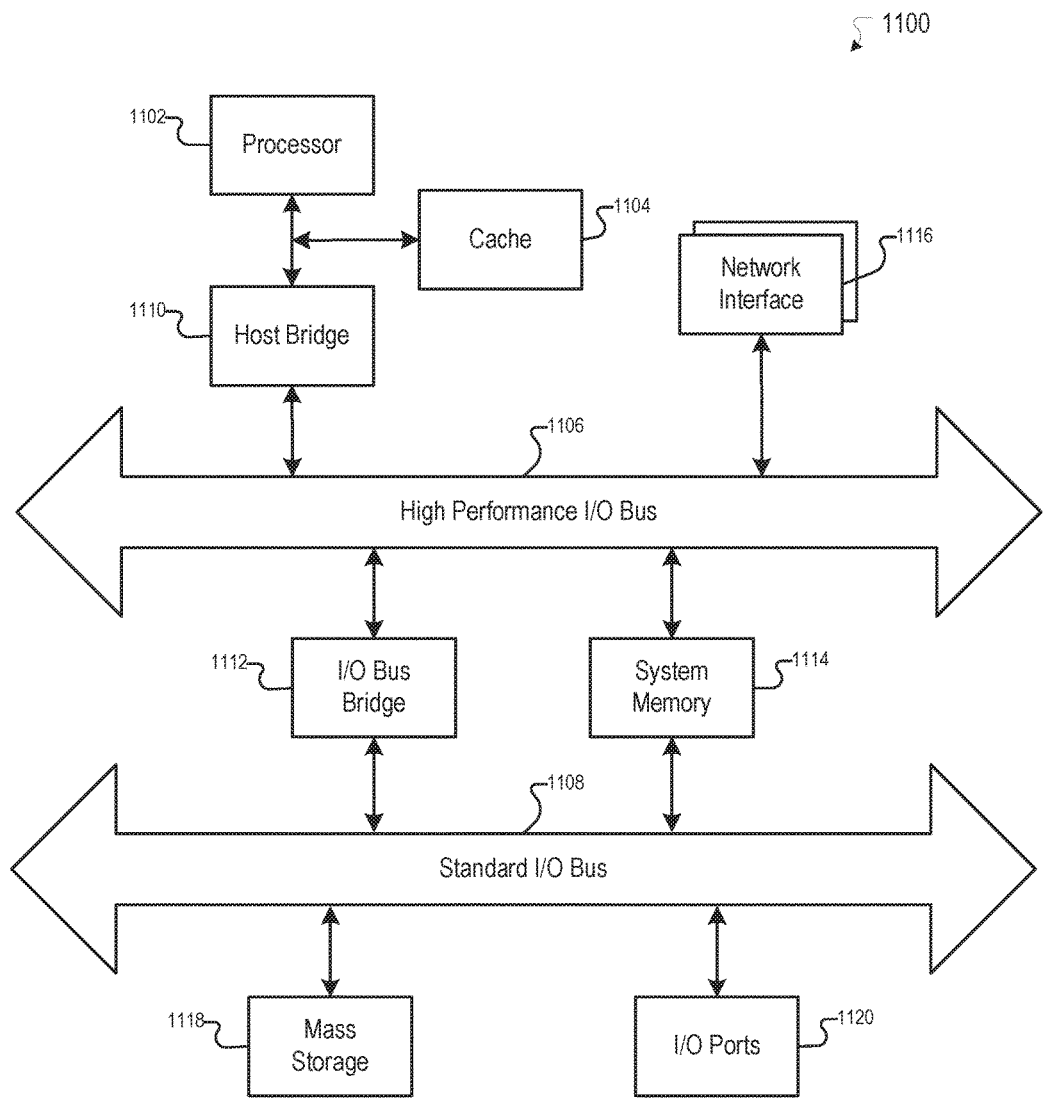
FIG. 11 illustrates an example of a computer system that may be used to implement one or more of the embodiments described herein, according to an embodiment of the present disclosure.

The foregoing processes and features can be implemented by a wide variety of machine and computer system architectures and in a wide variety of network and computing environments. FIG. 11 illustrates an example of a computer system 1100 that may be used to implement one or more of the embodiments described herein in accordance with an embodiment of the invention. For example, computer system 1100 may represent user device 1010 shown in FIG. 10 and/or mobile device 100.

The computer system 1100 includes sets of instructions for causing the computer system 1100 to perform the processes and features discussed herein. The computer system 1100 may be connected (e.g., networked) to other machines. In a networked deployment, the computer system 1100 may operate in the capacity of a server machine or a client machine in a client-server network environment, or as a peer machine in a peer-to-peer (or distributed) network environment. In an embodiment of the invention, the computer system 1100 may be the social networking system 1030, the user device 1010, and the external system 1020, or a component thereof. In an embodiment of the invention, the computer system 1100 may be one server among many that constitutes all or part of the social networking system 1030.

The computer system 1100 includes a processor 1102, a cache 1104, and one or more executable modules and drivers, stored on a computer-readable medium, directed to the processes and features described herein. Additionally, the computer system 1100 includes a high performance input/output (I/O) bus 1106 and a standard I/O bus 1108. A host bridge 1110 couples processor 1102 to high performance I/O bus 1106, whereas I/O bus bridge 1112 couples the two buses 1106 and 1108 to each other. A system memory 1114 and one or more network interfaces 1116 couple to high performance I/O bus 1106. The computer system 1100 may further include video memory and a display device coupled to the video memory (not shown). Mass storage 1118 and I/O ports 1120 couple to the standard I/O bus 1108. The computer system 1100 may optionally include a keyboard and pointing device, a display device, or other input/output devices (not shown) coupled to the standard I/O bus 1108. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1100 are described in greater detail below. In particular, the network interface 1116 provides communication between the computer system 1100 and any of a wide range of networks, such as an Ethernet (e.g., IEEE 802.3) network, a backplane, etc. The mass storage 1118 provides permanent storage for the data and programming instructions to perform the above-described processes and features implemented by the respective computing systems identified above, whereas the system memory 1114 (e.g., DRAM) provides temporary storage for the data and programming instructions when executed by the processor 1102. The I/O ports 1120 may be one or more serial and/or parallel communication ports that provide communication between additional peripheral devices, which may be coupled to the computer system 1100.

The computer system 1100 may include a variety of system architectures, and various components of the computer system 1100 may be rearranged. For example, the cache 1104 may be on-chip with processor 1102. Alternatively, the cache 1104 and the processor 1102 may be packed together as a "processor module", with processor 1102 being referred to as the "processor core". Furthermore, certain embodiments of the invention may neither require nor include all of the above components. For example, peripheral devices coupled to the standard I/O bus 1108 may couple to the high performance I/O bus 1106. In addition, in some embodiments, only a single bus may exist, with the components of the computer system 1100 being coupled to the single bus. Furthermore, the computer system 1100 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1100 that, when read and executed by one or more processors, cause the computer system 1100 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1100, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1102. Initially, the series of instructions may be stored on a storage device, such as the mass storage 1118. However, the series of instructions can be stored on any suitable computer readable storage medium. Furthermore, the series of instructions need not be stored locally, and could be received from a remote storage device, such as a server on a network, via the network interface 1116. The instructions are copied from the storage device, such as the mass storage 1118, into the system memory 1114 and then accessed and executed by the processor 1102.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1100 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer implemented method comprising:
   displaying, by a computing system, an image through an interface;
   receiving, by the computing system, a point of rotation of the image and a granularity selection point in the interface, selected by a touch gesture of a user,
      wherein the touch gesture is a finger slide of the user that is continuously maintained on the interface while selecting the point of rotation, the granularity selection point, and a direction and a degree of rotation;
   determining, by the computing system, a granularity of rotation of the image about the point of rotation based on a straight-line distance between the granularity selection point and the point of rotation; and
   rotating, by the computing system, the image about the point of rotation according to the granularity of rotation.

2. The computer implemented method of claim 1, further comprising:
   rotating the image at a first granularity of rotation about the point of rotation based on rotational movement of a first input at a first granularity selection point that is a first distance away from the point of rotation.

3. The computer implemented method of claim 2, further comprising:
   rotating the image at a second granularity of rotation about the point of rotation based on rotational movement of a second input at a second granularity selection point that is a second distance away from the point of rotation.

4. The computer implemented method of claim 1, wherein the granularity of rotation becomes finer as the distance between the granularity selection point and the point of rotation increases.

5. The computer implemented method of claim 1, wherein the granularity of rotation becomes finer as the distance between the granularity selection point and the point of rotation decreases.

6. The computer implemented method of claim 1, wherein the point of rotation is displayed as a point through the interface.

7. The computer implemented method of claim 1, wherein the granularity selection point is displayed as a point through the interface connected by a line to the point of rotation.

8. The computer implemented method of claim 1, wherein the point of rotation and the granularity selection point require re-selection after the finger slide is not applied to the interface.

9. A system comprising:
at least one hardware processor; and
a memory storing instructions that, when executed by the at least one processor, cause the system to perform:
  displaying an image through an interface;
  receiving a point of rotation of the image and a granularity selection point in the interface, selected by a touch gesture of a user,
    wherein the touch gesture is a finger slide of the user that is continuously maintained on the interface while selecting the point of rotation, the granularity selection point, and a direction and a degree of rotation;
  determining a granularity of rotation of the image about the point of rotation based on a straight-line distance between the granularity selection point and the point of rotation; and
  rotating the image about the point of rotation according to the granularity of rotation.

10. The system of claim 9, wherein the granularity of rotation becomes finer as the distance between the granularity selection point and the point of rotation increases.

11. A non-transitory computer readable medium including instructions that, when executed by at least one hardware processor of a computing system, cause the computing system to perform a method comprising:
  displaying an image through an interface;
  receiving a point of rotation of the image and a granularity selection point in the interface, selected by a touch gesture of a user,
    wherein the touch gesture is a finger slide of the user that is continuously maintained on the interface while selecting the point of rotation, the granularity selection point, and a direction and a degree of rotation;
  determining a granularity of rotation of the image about the point of rotation based on a straight-line distance between the granularity selection point and the point of rotation; and
  rotating the image about the point of rotation according to the granularity of rotation.

12. The non-transitory computer readable medium of claim 11, wherein the granularity of rotation becomes finer as the distance between the granularity selection point and the point of rotation increases.

13. The system of claim 9, wherein the granularity of rotation becomes finer as the distance between the granularity selection point and the point of rotation decreases.

14. The system of claim 9, wherein the point of rotation is displayed as a point through the interface.

15. The system of claim 9, wherein the granularity selection point is displayed as a point through the interface connected by a line to the point of rotation.

16. The system of claim 9, wherein the point of rotation and the granularity selection point require re-selection after the finger slide is not applied to the interface.

17. The non-transitory computer readable medium of claim 11, wherein the granularity of rotation becomes finer as the distance between the granularity selection point and the point of rotation decreases.

18. The non-transitory computer readable medium of claim 11, wherein the point of rotation is displayed as a point through the interface.

19. The non-transitory computer readable medium of claim 11, wherein the granularity selection point is displayed as a point through the interface connected by a line to the point of rotation.

20. The non-transitory computer readable medium of claim 11, wherein the point of rotation and the granularity selection point require re-selection after the finger slide is not applied to the interface.

* * * * *